United States Patent
Recknagel

(10) Patent No.: US 7,295,909 B2
(45) Date of Patent: Nov. 13, 2007

(54) METHOD FOR THE DETECTION OF AN IMPACT

(75) Inventor: Rolf-Juergen Recknagel, Jena (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/528,572

(22) PCT Filed: Feb. 26, 2003

(86) PCT No.: PCT/DE03/00614

§ 371 (c)(1),
(2), (4) Date: Sep. 2, 2005

(87) PCT Pub. No.: WO2004/028866

PCT Pub. Date: Apr. 8, 2004

(65) Prior Publication Data

US 2006/0124378 A1    Jun. 15, 2006

(30) Foreign Application Priority Data

Sep. 19, 2002    (DE) .............................. 102 43 514

(51) Int. Cl.
*G06F 7/00*    (2006.01)
(52) U.S. Cl. ....................... 701/45; 340/436; 307/10.1; 280/735; 180/282
(58) Field of Classification Search ................. 701/45, 701/301; 340/436, 425.5; 180/274, 282; 280/734, 735; 702/190; 307/10.1
See application file for complete search history.

(56) References Cited

U.S. PATENT DOCUMENTS

| | | | | |
|---|---|---|---|---|
| 3,851,305 A * | 11/1974 | Baba et al. ................. | 180/274 |
| 5,285,187 A * | 2/1994 | Hirao et al. ................. | 340/436 |
| 5,483,449 A * | 1/1996 | Caruso et al. ................. | 701/46 |
| 5,572,511 A * | 11/1996 | Ouyang et al. ............. | 370/248 |
| 5,748,075 A | 5/1998 | Bauer et al. ................. | 340/436 |
| 5,910,851 A * | 6/1999 | Flaherty ....................... | 398/36 |
| 6,426,567 B2 * | 7/2002 | Ugusa et al. ............... | 307/10.1 |
| 6,549,836 B1 * | 4/2003 | Yeh et al. ..................... | 701/45 |
| 6,636,791 B2 * | 10/2003 | Okada .......................... | 701/35 |
| 6,711,485 B2 * | 3/2004 | Feser et al. ................... | 701/45 |
| 6,825,765 B2 * | 11/2004 | Stanley et al. .............. | 340/561 |
| 2002/0147533 A1* | 10/2002 | Foo et al. ..................... | 701/45 |

(Continued)

FOREIGN PATENT DOCUMENTS

CN        1137779        12/1996

(Continued)

OTHER PUBLICATIONS

Pottker et al., *A Unity Power Factor Buck Pre-Regulator With Feedforward of the Output Inductor Current*, IEEE, Piscataway, NJ, Mar. 14, 1999, pp. 1130-1135.

*Primary Examiner*—Tuan C To
(74) *Attorney, Agent, or Firm*—Kenyon & Kenyon LLP

(57) ABSTRACT

A method for detecting a side collision, in which either temperature or pressure sensors are provided for detecting an adiabatic increase in pressure or temperature. The signals of these sensors are filtered with a low pass filter and then, as a function of a signal of a sensitivity block, checking of the signal for various criteria is initiated. Besides the pure temperature and pressure signals, these criteria include checks of the first and second derivative of the signal as a function of time.

7 Claims, 2 Drawing Sheets

U.S. PATENT DOCUMENTS

| | | | |
|---|---|---|---|
| 2004/0065497 A1* | 4/2004 | Roelleke et al. | 180/282 |
| 2004/0088094 A1* | 5/2004 | Kleinschmidt et al. | 701/45 |
| 2004/0195030 A1* | 10/2004 | Eberle et al. | 180/271 |
| 2005/0257981 A1* | 11/2005 | Iyoda et al. | 180/282 |

FOREIGN PATENT DOCUMENTS

| | | |
|---|---|---|
| DE | 196 19 468 | 8/1997 |
| DE | 198 30 835 | 1/2000 |
| DE | 100 57 258 | 3/2002 |
| EP | 667 822 | 8/1995 |
| EP | 0709256 | 5/1996 |
| JP | 08062239 A * | 3/1996 |

* cited by examiner

METHOD FOR THE DETECTION OF AN IMPACT

FIELD OF THE INVENTION

The present invention is based on a method for detecting a collision.

BACKGROUND INFORMATION

From German Patent No. 100 57 258, a method for side crash detection using a temperature sensor is known; this sensor measures an adiabatic increase in temperature upon a deformation of a side part of a vehicle. The absolute temperature increase and the temperature gradient are ascertained. They are compared with predetermined thresholds, to ascertain whether a side crash is involved, or not. Only if both thresholds are exceeded does a side crash exist, and a plausibility check is performed with an acceleration sensor. As a function of the plausibility check and the collision signal, restraint means are deployed as appropriate.

From European Published Patent Application No. 667 822, a pressure sensor is known which detects an adiabatic pressure increase in a largely closed side part of the vehicle body as a collision evaluation parameter. Once again a plausibility sensor is provided. Filtering of the signal below one kilohertz may be provided.

From German Patent No. 198 30 835, a method for deploying a restraint means is known in which a sensor system furnishes a pressure signal. The algorithm that detects the collision uses a variable threshold, which depends on the change in the pressure signal.

From German Patent No. 196 19 468, a method for deploying a restraint means for side crash protection in a vehicle is known in which the deployment of a restraint means is performed as a function of a mean value signal of the pressure signal and as a function of an increase in the pressure signal.

A disadvantage of the algorithms proposed in the related art for evaluating pressure and temperature signals is that there are some instances that do not call for deployment that are difficult to distinguish from genuine crashes. Especially the impact of a soccer ball, kicks, or a bicycle, or at least shutting doors very forcefully, generates pressure and temperature signals that in general are hard to distinguish from crashing into a pole at low speed.

SUMMARY OF THE INVENTION

The method according to the present invention for detecting a collision has the advantage over the above that the pressure and temperature signals are first subjected to low-pass filtration at approximately 400 Hz, since the crash-relevant data in the pressure and temperature signal are located in the low-frequency component of the signal. The low-pass filtration is moreover indispensable for attuning the sensitivity of the derivative of the signal to the scaling of the signal properties of interest. In particular, the first comparison defines the sensitivity of the algorithm. The threshold is adjusted such that exceeding the amount of the threshold, in either the positive or the negative direction, causes starting of the algorithm and further comparisons. The other comparisons may be of various kinds; the simplest comparison is the pressure or temperature signal itself. This will lead for instance to a deployment or detection of a collision, if what is involved is a high-speed crash into a hard obstacle, or an oblique crash in which the door is affected only late in the event. If the pressure change or temperature change is used, then high-speed pole crashes, that is, crashes which only locally penetrate the vehicle relatively unhindered, are detected. In a third path, it is provided that a product of the first and the delayed second derivative be compared with a threshold. Both the first and second derivatives must be greater than zero. The goal of this path is to detect a major positive curvature followed by a sharp increase. One possibility is the variant shown; others are conceivable.

By the combination of a low-pass filter and the use of a derivative operator once or twice, so-called wavelet filtrations with one or two vanishing moments, respectively, are created. In approximate terms, a wavelet with one vanishing moment detects changes in the signal at a defined scaling, while a wavelet with two vanishing moments more likely detects curvatures in the signal. This kind of signal course, that is, a positive curvature followed by a major increase, occurs when the penetrating object strikes more-rigid structures, such as a B pillar or a reinforcing tube, and as a result the intrusion or in other words penetration into the vehicle is braked somewhat. If the applicable structure then yields, the object penetrates all the faster. This effect may also be caused by a deformation of the penetrating object, in this case a soft barrier. In so-called misuses, or in other words mistaken deployment events caused by a soccer ball, a kick or a bicycle, such effects occur far less often, so this provides a very good criterion to distinguish between critical misuses and, for instance, low-speed crashes into a pole and soft barrier crashes. Distinguishing between misuses and crashes that do call for deployment must be done via the algorithm, since in the so-called misuses, even plausibility sensors would be enabled. Thus once the sensitivity check has found that the sensitivity threshold has been exceeded, only one of these paths needs to deploy. That is, only either the signal itself, the first derivative, or the second derivative multiplied by the first derivative.

It is especially advantageous that the first or at least the one second threshold is adapted in its course over time. That is, as a function of the pressure or temperature signal or their derivatives, the thresholds may be adapted in order to make it possible to react appropriately to certain situations. For instance, if a situation that leads to a pressure or temperature increase is detected and would thus cause mistaken deployment, it is possible in such a case to raise the thresholds for a certain time and then lower them again. The method of the present invention is especially well suited to detecting a side crash. If the method of the present invention is used for detecting side crashes, a frontal crash signal may optionally have an influence on the sensitivity. Thus in a crash, it is possible to prevent a frontal crash from causing unintentional deployment of side protective devices.

DETAILED DESCRIPTION

Figure 1:
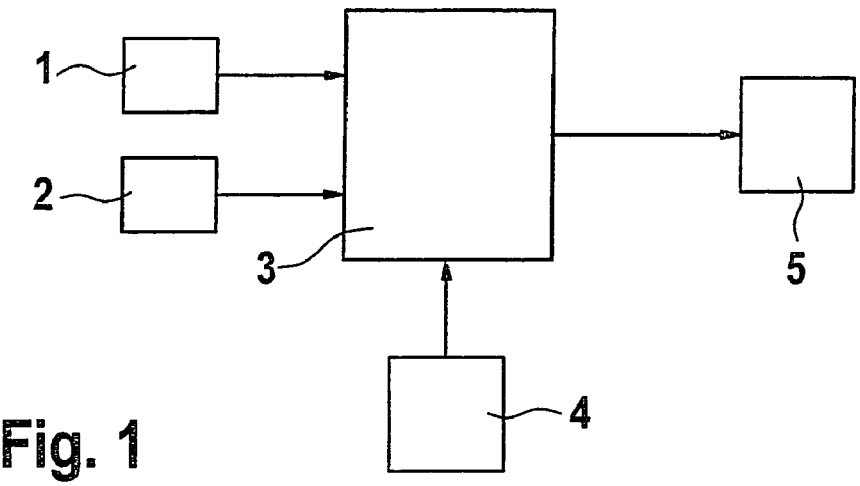
FIG. 1 is a block circuit diagram showing an apparatus that employs the method of the present invention.

FIG. 1, in a block circuit diagram, shows an apparatus in which the method of the present invention is performed. Two crash sensors 1 and 2, which evaluate the adiabatic change of state, are each connected to a control unit 3. A plausibility sensor 4 is also connected to control unit 3 via a third data input. Via a data output, control unit 3 is connected to a restraint system. Optionally, control unit 3 may be connected to a passenger classification system as well, so that only those restraint means that are suitable for the applicable passengers are deployed.

Crash sensors 1 and 2, which furnish a signal as a function of the adiabatic change of state in a vehicle part, are either pressure sensors or temperature sensors. These sensors are disposed in a part of the vehicle that is for the most part closed, so that an adiabatic pressure increase may occur upon a deformation of the vehicle part. This type of crash sensing is extremely fast and is for instance superior to the signals of acceleration sensors. Sensors 1 and 2 include a signal processor, an analog/digital converter, and a transmitter module, which transmits the signals to control unit 3. Sensors 1 and 2 are in fact located externally to control unit 3, because of their function. If the two sensors 1 and 2 function as side crash sensors, then they are located in side parts of the vehicle, such as the doors. Instead of two side crash sensors, it is also possible to use more than two, for instance four, for each side part. In addition, such sensors may be installed for rear-end and frontal crashes as well. The sensor signals are then evaluated in control unit 3, which includes a processor for the purpose. However, for deploying restraint means 5, such as air bags or belt tighteners, the signals of sensors 1 and 2 must be checked for plausibility by a further sensor 4. An acceleration sensor is used for this purpose. Alternatively, it is possible to use a structure-borne sound sensor or a surrounding-area sensor system for this purpose. Sensor 4 likewise includes a signal processor, an analog/digital converter, and a transmitter module, for transmitting its measurement signals to control unit 3. Sensors 1, 2 and 4 may each be embodied micromechanically, since that is a production technique that makes high-precision mass production in great numbers possible. It is possible for sensor 4 to be disposed in control unit 3, specifically in the same housing. External sensors 1, 2 and 4 are connected here with control unit 3 via a unidirectional connection; that is, sensors 1, 2 and 4 each send their data to the control unit, which then evaluates these data. However, control unit 3 sends no data to sensors 1, 2 and 4. For that purpose, control unit 3 applies a direct current to the lines, and from this current, sensors 1, 2 and 4 each draw their energy. By current modulation, such as amplitude or pulse width modulation, the sensor values are then modulated to this direct current. Alternatively, it is possible to use a bidirectional connection in each case, or a bus to which the sensors are connected.

Figure 2:
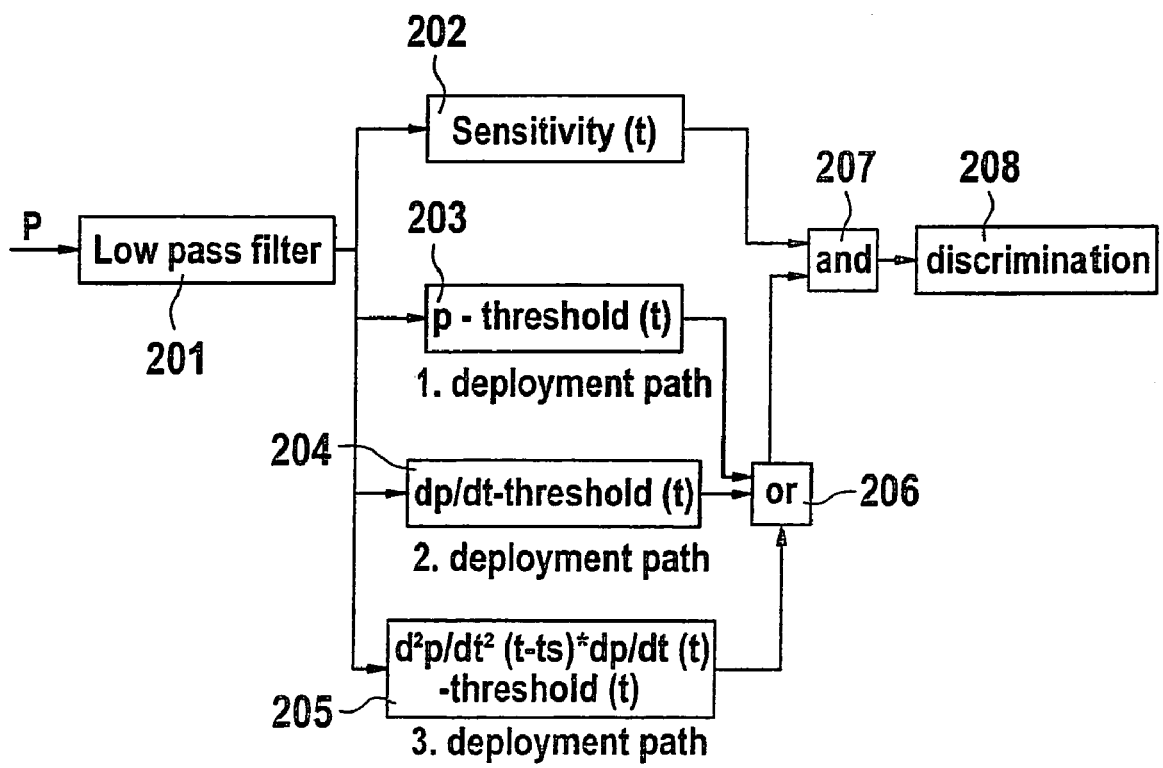
FIG. 2 is a block diagram of the method of the present invention for evaluating pressure sensors.

FIG. 2, in a block diagram, shows the method of the present invention for evaluating pressure signals. Pressure signal P is fed into a low-pass filter 201, since the crash-relevant data in the pressure signal are located in the low-frequency component of the signal. In this first step, a low-pass filtration to approximately 400 Hz is performed. The low-pass filter is preferably a third order low-pass filter, for the sake of attaining the appropriate precision. Since first and second derivatives are used in this algorithm or method, a low-pass filtration is indispensable, for adapting the sensitivity of the derivative to the scaling of the signal properties of interest over time.

The signal of low-pass filter 201 then passes to a sensitivity block 202, a threshold comparator 203 for the filtered pressure signal, a further threshold comparator 204, which compares the time derivative of the pressure with a threshold, and a third threshold comparator 205, which compares the second derivative of the pressure, multiplied by the first derivative of the pressure, with a further threshold. Blocks 204 and 205 each include differentiator functions, for performing a time derivative of the pressure and a second time derivative of the pressure, respectively. Blocks 202 through 205 include time-dependent thresholds, with which the signals are compared. The thresholds vary as a function of the signals themselves. In this context, it is taken into account that certain given physical conditions in a certain signal behavior must be considered in order to avoid mistaken deployment events. In sensitivity block 202, pressure signal P must have exceeded a time-dependent threshold for blocks 203 through 205 to become active. The time-dependent thresholds used rise after the algorithm has been started and may also drop again over the later course. This is appropriate, since especially in crashes that do not initially affect the door and in low-speed crashes, the door deformation takes somewhat longer, and thus because the door is always intrinsically permeable, the signal does not attain the pressure change corresponding to the volume change.

In block 203, a simple time-dependent threshold is applied to the pressure signal itself and serves among other purposes for deployment in high-speed crashes into a hard obstacle and also in oblique crashes in which the door is affected only relatively late, and in which deployment of the air bag, while not absolutely necessary, is usually expected, since the automobile may be very heavily damaged. In general, the damage may be total.

In block 204, the pressure signal, which has been filtered, is first differentiated once as a function of time. The pressure change, that is, a gradient, is thus available. In block 204, a further time-dependent threshold is then applied to this pressure change, and this threshold also varies again as a function of the pressure change. Thus above all high-speed pole crashes are detected, that is, crashes with objects that only locally penetrate the vehicle relatively unhindered.

In block 205, a time-dependent threshold is applied to the product of the first and a delayed second derivative of the pressure signal, both of which must be greater than zero. To that end, block 205 includes appropriate functions for differentiation of the pressure signal with respect to time once and twice. The intent here is to detect a major positive curvature followed by a sharp increase. A signal course of this kind occurs when the penetrating object strikes more-rigid structures, such as the B pillar or a reinforcing tube, and as a result the intrusion is braked. If the applicable structure then yields, the object penetrates all the faster. This effect may also be caused by the deformation of the penetrating object, such as soft barriers or another vehicle. In mistaken deployment events caused for instance by a soccer ball, a kick or a bicycle, such effects occur far less often, so that this provides a very good criterion for distinguishing between critical mistaken deployment events and, for instance, low-speed crashes into a pole and crashes into a soft barrier. Distinguishing between mistaken deployment events and deployment crashes must be done via the algorithm, since in the mistaken deployment events mentioned, plausibility sensors, such as sensor 4, would also be enabled.

By the combination of low-pass filter 201 and the use of a derivative operator once or twice in block 205, wavelet filtrations with one and two vanishing moments, respectively, are created. In approximate terms, a wavelet with one vanishing moment detects changes in the signal at a defined scaling, while a wavelet with two vanishing moments more likely detects curvatures in the signal.

Block 202 is connected to an AND gate 207, while blocks 203 through 205 are connected to an OR gate 206. The output of OR gate 206 is then connected to a second input of AND gate 207. That is, only if sensitivity block 202, in its threshold comparison, has detected that the pressure signal is above the first threshold, and if at least one of blocks 203 through 205 has detected the exceeding of a threshold, is a logical "1" present at the output of AND gate 207, and in block 208 the deployment decision is made, taking into account the signal from the plausibility sensor as well.

Figure 3:
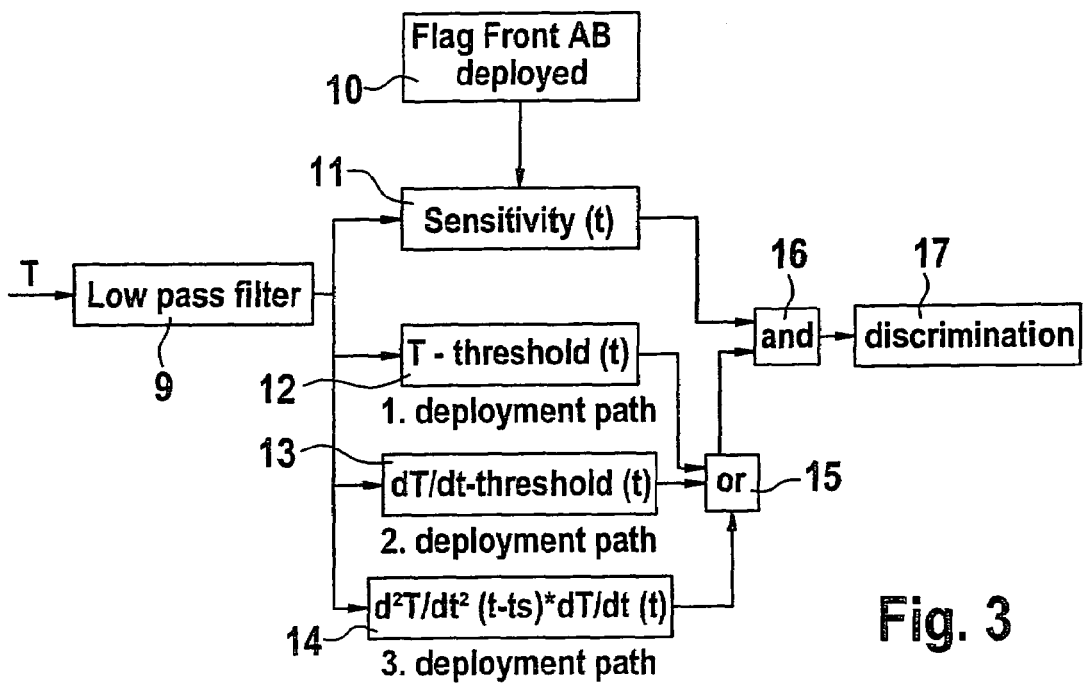
FIG. 3 is a block diagram of the method of the present invention for evaluating temperature signals.

In FIG. 3, a second block diagram is shown. The method of the present invention is shown here for a temperature sensor. Temperature signal T is fed to a low-pass filter 9 for the reasons given above. Once again, the crash-relevant data are in the low-frequency component, so that once again a low-pass filtration at approximately 400 Hz is performed. The same is true for the low-pass filtration, since once again the first and second derivatives are used to detect a crash. The filtered signal is then output from the output of low-pass filter 9 to blocks 11 through 14. In block 11, the sensitivity of the method of the present invention is defined. In block 12, the temperature is compared with a time-dependent threshold. This threshold likewise varies as a function of the instantaneous temperature signal. In block 13, the derivative of the temperature is in turn compared with a further threshold, which is also time-dependent. In block 14, analogously to the pressure evaluation, a product of the first derivative of the temperature and the second derivative of the temperature, which is offset somewhat in time, is formed. Blocks 12, 13 and 14 are connected to data inputs of an OR gate 15. The output of OR gate 15 leads to a first data input of an AND gate 16, to whose second data input sensitivity block 11 is connected. In block 17, the plausibility check and crash detection then take place. Furthermore, sensitivity block 11 receives a signal from front air bag 10.

If sensitivity block 11 detects that the signal has exceeded a threshold, and in accordance with the amounts, or in other words in the positive or negative direction, blocks 12 through 14 then begin their comparisons. The fact that these comparisons begin when a negative threshold is undershot is due to the fact that this is possible only when a door is shut, because then the inside lining of the door lifts slightly from the door because of its inertia, resulting in a negative pressure, or in other words, cooling down in the inside portion of the door. The swing back causes a pressure increase, or in other words heating. This heating is more easily blanked out if it occurs somewhat later after the starting algorithm, since then the thresholds are generally adjusted so as to be less sensitive.

In block 11, the sensitivity of the algorithm is accordingly determined; the temperature must have exceeded a time-dependent threshold in order for the other three blocks 12 through 14 to become active. This time-dependent threshold is influenced by an additional parameter 10, specifically the flag that tells whether front air bag deployment has occurred. In this case, a pressure wave is created, which causes compression of the door volume and thus a temperature increase, which is recorded by the temperature sensor. As a result, the system becomes more sensitive to possible side crashes. For correct deployment in the case of a subsequent side collision as well, the time-dependent threshold is correspondingly increased in block 11 for the duration of the pressure wave.

The time-dependent thresholds used rise after the algorithm has been started and may also drop again over the later course. This is appropriate, since especially in crashes that do not initially affect the door and in low-speed crashes, the door deformation takes somewhat longer, and thus because the door is always intrinsically permeable, the signal does not attain the temperature change expected.

In block 11, a simple time-dependent threshold is applied to the temperature signal itself and serves among other purposes for deployment in high-speed crashes into a hard obstacle and also in oblique crashes in which the door is affected only very late, and in which deployment of the air bag, while not absolutely necessary, is usually expected, since the automobile may be very heavily damaged. In general, the damage may be total.

In block 13, a time-dependent threshold is applied to the temperature change. This path serves above all for deployment in high-speed pole crashes, that is, collisions with objects that only locally penetrate the vehicle relatively unhindered.

The next block 14 is a time-dependent threshold for the product of the first derivative and the delayed second derivative, both of which must be greater than zero. The goal of this block 14 is to detect a major positive curvature, followed by a sharp increase. By the combination of the low-pass filter and the use of a derivative operator once or twice, wavelet filtrations with one or two vanishing moments, respectively, are created. In approximate terms, a wavelet with one vanishing moment detects changes in the signal at a defined scaling, while a wavelet with two vanishing moments more likely detects curvatures in the signal. Such a signal course occurs when the penetrating object strikes rigid structures, such as the B pillar or the reinforcing tube. As a result the intrusion is braked somewhat. If the applicable structure then yields, the object penetrates all the faster. This effect may also be caused by the deformation of the penetrating object a soft barrier. In mistaken deployment events a soccer ball, a kick or a bicycle, such effects occur far less often, so this provides a very good criterion to distinguish between critical misuses, that is, mistaken deployment, low-speed crashes into a pole and into soft barriers, for instance. Distinguishing between mistaken deployment and crashes that do call for deployment must be done via the algorithm, since in the so-called mistaken deployment events, even plausibility sensors would be enabled. Blocks 12 through 14 may accordingly make a deployment decision independently of one another; this decision must then be confirmed with plausibility signals by other sensors installed in the car in order to reach the final decision. Thus if at least one of blocks 12 through 14 indicates a crash, then OR gate 15 sends a logical "1" to AND gate 15, and sensitivity block 11 also outputs a logical "1" then, because after all, only then may blocks 12 through 14 be made active. In that case, AND gate 16 then outputs a logical "1" to block 17, so that block 17 then performs this crash detection, as a function of the plausibility signals of sensor 4, in order to deploy restraint means 5.

Figure 4:
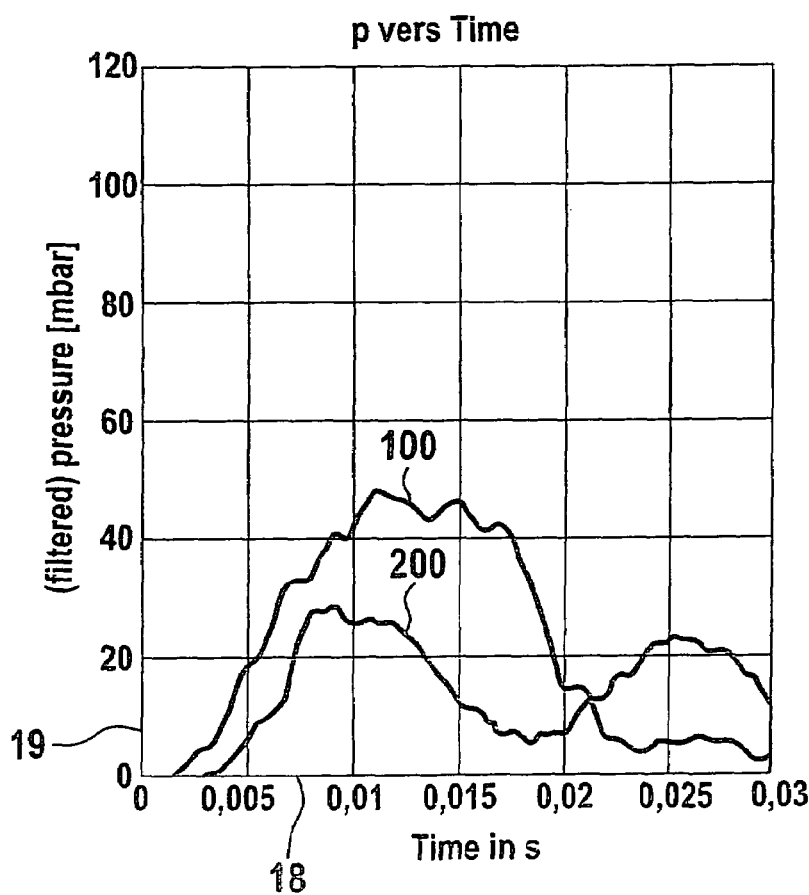
FIG. 4 shows a typical signal course.

In FIG. 4, a graph shows the dependency on time of the pressure in a side part of the vehicle. The time is plotted on abscissa 18, and the pressure is plotted on ordinate 19. Curve 100 is the pressure course in a 25 km/h collision with a bicycle, and curve 2 is the pressure course in a 20 km/h crash into a pole in the vicinity of the B pillar. Only with the aid of block 14 or 15 is it possible to classify these two cases correctly and to make a tripping decision in good time.

What is claimed is:

1. A method for detecting a collision as a function of at least one of a pressure signal and a temperature signal representing an adiabatic change of state, comprising:
   performing a first comparison of the at least one of the pressure signal and the temperature signal with at least a first threshold;

performing on the at least one of the pressure signal and the temperature signal a low pass filtration before the first comparison;

deriving a variable from the at least one of the pressure signal and the temperature signal;

performing at least one second comparison of the variable with at least one second threshold;

detecting the collision as a function of the first comparison and the at least one second comparison; and adjusting a sensitivity of the detection, by adjusting at least one of the first threshold and the at least one second threshold, in accordance with the first comparison in that the at least one second comparison is performed only after an amount of the first threshold is exceeded.

2. The method as recited in claim 1, wherein the method is used to detect a lateral collision.

3. A method for detecting a collision as a function of at least one of a pressure signal and a temperature signal representing an adiabatic change of state, comprising:

performing a first comparison of the at least one of the pressure signal and the temperature signal with at least a first threshold;

performing on the at least one of the pressure signal and the temperature signal a low pass filtration before the first comparison;

deriving a variable from the at least one of the pressure signal and the temperature signal;

performing at least one second comparison of the variable with at least one second threshold;

detecting the collision as a function of the first comparison and the at least one second comparison;

adjusting a sensitivity of the detection, by adjusting at least one of the first threshold and the at least one second threshold, in accordance with the first comparison in that the at least one second comparison is performed only after an amount of the first threshold is exceeded, and adapting at least one of the first threshold and the second threshold over the course of time.

4. A method for detecting a collision as a function of at least one of a pressure signal and a temperature signal representing an adiabatic change of state, comprising:

performing a first comparison of the at least one of the pressure signal and the temperature signal with at least a first threshold;

performing on the at least one of the pressure signal and the temperature signal a low pass filtration before the first comparison;

deriving a variable from the at least one of the pressure signal and the temperature signal;

performing at least one second comparison of the variable with at least one second threshold;

detecting the collision as a function of the first comparison and the at least one second comparison; and adjusting a sensitivity of the detection, by adjusting at least one of the first threshold and the at least one second threshold, in accordance with the first comparison in that the at least one second comparison is performed only after an amount of the first threshold is exceeded;

wherein the second comparison is performed for checking a product of a first time derivative and a second time derivative.

5. The method as recited in claim 4, further comprising:

varying the first threshold as a function of a frontal collision.

6. A method for detecting a collision as a function of at least one of a pressure signal and a temperature signal representing an adiabatic change of state, comprising:

performing a first comparison of the at least one of the pressure signal and the temperature signal with at least a first threshold;

performing on the at least one of the pressure signal and the temperature signal a low pass filtration before the first comparison;

deriving a variable from the at least one of the pressure signal and the temperature signal;

performing at least one second comparison of the variable with at least one second threshold;

detecting the collision as a function of the first comparison and the at least one second comparison;

adjusting a sensitivity of the detection, by adjusting at least one of the first threshold and the at least one second threshold, in accordance with the first comparison in that the at least one second comparison is performed only after an amount of the first threshold is exceeded; and raising and then lowering the at least one second threshold.

7. A method for detecting a collision as a function of at least one of a pressure signal and a temperature signal representing an adiabatic change of state, comprising:

performing a first comparison of the at least one of the pressure signal and the temperature signal with at least a first threshold;

performing on the at least one of the pressure signal and the temperature signal a low pass filtration before the first comparison;

deriving a variable from the at least one of the pressure signal and the temperature signal;

performing at least one second comparison of the variable with at least one second threshold;

detecting the collision as a function of the first comparison and the at least one second comparison;

adjusting a sensitivity of the detection, by adjusting at least one of the first threshold and the at least one second threshold, in accordance with the first comparison in that the at least one second comparison is performed only after an amount of the first threshold is exceeded; and as a function of a detection of the collision, performing a deployment decision for deploying a restraint device in accordance with at least one plausibility signal.

* * * * *